United States Patent
Boyd (10) Patent No.: US 9,498,078 B2
(45) Date of Patent: Nov. 22, 2016

(54) TRANSPORT DEVICE INCORPORATING FULL-BODY IMMERSION BAPTISMAL POOL HAVING AUTOMATIC COMFORT, ADJUSTMENT, AND BAPTISM ASSISTANCE FEATURES

(71) Applicant: Joy Boyd, Newark, DE (US)

(72) Inventor: Joy Boyd, Newark, DE (US)

( * ) Notice: Subject to any disclaimer, the term of this patent is extended or adjusted under 35 U.S.C. 154(b) by 0 days.

(21) Appl. No.: 14/317,826

(22) Filed: Jun. 27, 2014

(65) Prior Publication Data
US 2015/0157158 A1 Jun. 11, 2015

Related U.S. Application Data

(63) Continuation of application No. 14/099,053, filed on Dec. 6, 2013, now abandoned.

(51) Int. Cl.
| | |
|---|---|
| *A47K 3/02* | (2006.01) |
| *A47G 33/00* | (2006.01) |
| *B60R 15/02* | (2006.01) |
| *A61G 7/10* | (2006.01) |

(52) U.S. Cl.
CPC .............. *A47G 33/00* (2013.01); *B60R 15/02* (2013.01); *A61G 7/1003* (2013.01)

(58) Field of Classification Search
CPC ...... A47G 33/00; A47G 33/02; A47G 33/08; B60P 3/00; B60P 3/36; A61G 7/1003; A61G 7/1005

USPC ............. 4/560.1, 561.1, 562.1, 563.1, 564.1, 4/565.1, 566.1
See application file for complete search history.

(56) References Cited

U.S. PATENT DOCUMENTS

| | | | | |
|---|---|---|---|---|
| 2,844,155 | A | * | 7/1958 | Hebard .................... 4/573.1 |
| 2,869,140 | A | | 1/1959 | Wiedemann, Jr. |
| 3,469,265 | A | | 9/1969 | Bradley |
| 3,905,308 | A | * | 9/1975 | Laudato, Jr. ............... 4/494 |
| 4,233,694 | A | * | 11/1980 | Janosko et al. ............ 4/541.3 |
| 4,371,995 | A | * | 2/1983 | Donhauser .................. 4/538 |
| 4,466,141 | A | * | 8/1984 | Starkey ...................... 4/488 |
| 4,726,081 | A | * | 2/1988 | Duffin ............... A61G 7/1003 4/564.1 |
| 4,855,569 | A | * | 8/1989 | Wiedemann ................ 4/493 |
| 4,938,469 | A | * | 7/1990 | Crandell .................... 4/492 |
| 5,287,568 | A | * | 2/1994 | Mohrmann .................. 4/561.1 |
| D385,084 | S | * | 10/1997 | Menichiello .............. D99/25 |
| 5,779,315 | A | * | 7/1998 | Shultz ....................... 4/496 |
| 5,829,069 | A | * | 11/1998 | Morgan et al. ............. 4/493 |
| 5,967,583 | A | | 10/1999 | Wishart |
| 6,647,562 | B1 | * | 11/2003 | Arout et al. ................ 4/506 |
| 6,899,375 | B2 | * | 5/2005 | Sankrithi et al. .......... 296/156 |
| 7,621,576 | B2 | | 11/2009 | Cote |

* cited by examiner

*Primary Examiner* — Erin Deery (57) ABSTRACT

Full-body immersion baptismal pools and transport devices, having full-body immersion baptismal pools incorporated therein, incorporate automatic, comfort, adjustment, and baptism-assistance features. Such features include water level adjustment, temperature adjustment, a self-cleaning features, internal air freshening, a dehumidification, filtration adjustment, and sanitation adjustment.

7 Claims, 11 Drawing Sheets

TRANSPORT DEVICE INCORPORATING FULL-BODY IMMERSION BAPTISMAL POOL HAVING AUTOMATIC COMFORT, ADJUSTMENT, AND BAPTISM ASSISTANCE FEATURES

CROSS-REFERENCE TO RELATED APPLICATION

This application is a continuation-in-part of U.S. patent application Ser. No. 14/099,053, filed Dec. 6, 2013. The entirety of the aforementioned priority application is incorporated herein by reference.

BACKGROUND

1. Field of the Invention

The field of the present invention relates to full-body immersion baptismal pools and transport devices having full-body immersion baptismal pools incorporated therein, and particularly full-body immersion baptismal pools and devices that incorporate automatic, comfort, adjustment, and baptism-assistance features.

2. Background

For Christians, baptism is considered an outward expression of the acceptance of Jesus Christ as Lord and Savior. Although different denominations of Christianity have different methods of baptism, full-body immersion baptism is frequently practiced. During full-body immersion baptism, the full body (i.e. from the top of the head to the soles of the feet) of a person is completely submerged underwater. But, regardless of the method chosen, baptism is a time of great faith and commitment for those who follow the Christian way.

Depending upon location, a full-body immersion baptism will usually take place either in a baptismal pool, which has been incorporated into a church sanctuary or at a nearby body of water where those being baptized are "dipped." Usually during a baptism ceremony, the person being baptized is supported by two or more persons during the immersion process. Therefore, either type of location must have sufficient width for at least three persons to stand upright in the pool and sufficient length and depth for one person's body to be fully submerged underwater in the pool.

When a full-body immersion baptismal pool is located inside of a sanctuary, the room should have sufficient height and clearance to accommodate all users participating in the ceremony. Also because of the nature of the ceremony, often friends and family are positioned near the baptismal pool to witness the baptism. As such, the location of the pool should be easily accessible or viewable by onlookers and participants. Because of these and other requirements for full-body immersion baptismal pools, some churches are required to travel to a remote location to practice baptism or bear the expense of constructing a full-body immersion baptismal pool.

Because of the inconvenience of traveling and the expense of construction, some portable baptismal pools have been proposed. These types of baptismal pools seek to serve the needs of churches without baptismal pools and churches without convenient access to nearby bodies of water. Although useful for their intended purpose, many of these baptismal pools are difficult to assemble and often do not fully meet the length, width and height requirements necessary for full-body immersion baptism. These pools are also not configured to accommodate handicapped persons (e.g. those confined to a wheelchair or hospital bed) and/or persons who weigh up to 1000 pounds.

Because of their "portable" nature, many proposed portable baptismal pools are not constructed from sturdy materials. These portable baptismal pools also do not include features that would make the baptismal experience more comfortable. For example, few, if any portable baptismal pools includes automatic adjustments for temperature, water level and other enhancements that would assist the baptizer (i.e. those who are assisting the person being baptized). As a result, these types of portable pools may distract away from the overall baptismal experience. There is also a need for baptismal pool that offers baptism-assistance features. Such features allow a person to be baptized without assistance.

For these reasons, among others, there is a clear need for portable baptismal pools including automatic and comfort features, as well as transport devices that incorporate the full-body immersion baptismal pools with automatic and comfort features. The present invention fills the present need for improved baptismal pools and provides further related advantages, as disclosed herein.

BRIEF DESCRIPTION OF THE DRAWINGS

The drawings described herein are for illustrative purposes only and are not intended to limit the scope of the present disclosure. In the drawings.

DETAILED DESCRIPTION

Reference will now be made in detail to the aforementioned embodiments of the invention, as illustrated in the accompanying drawings. The same or like reference numbers may be used throughout the drawings to refer to the same or like features. It should be noted that the drawings are in simplified form and not drawn to precise scale. In reference to the disclosure herein, for purposes of convenience and clarity only, directional terms such as top, bottom, above, below, are used with respect to the accompanying drawings. Such directional terms used in conjunction with the following description of the drawings should not be construed to limit the scope of the invention in any manner not explicitly set forth herein. Unless specifically set forth herein, the terms "a", "an" and "the" are not limited to one element but instead should be read as meaning "at least one". The terminology referred to herein also includes the words noted above, derivatives thereof and words of similar import.

Figure 1:
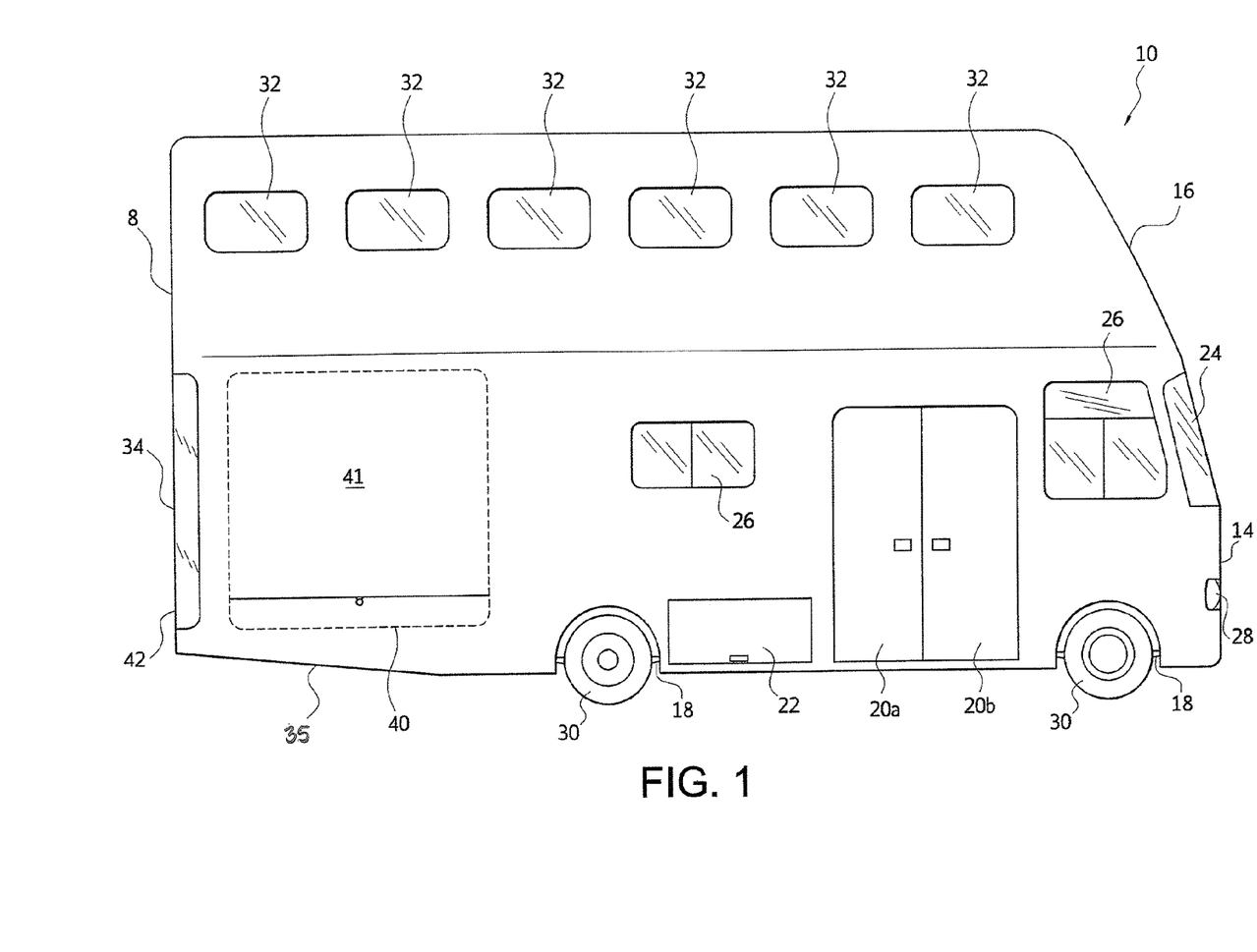
FIG. 1 is a right side view of a first embodiment of a transport device having a first embodiment of full-body immersion baptismal pool incorporated therein.
Figure 2:
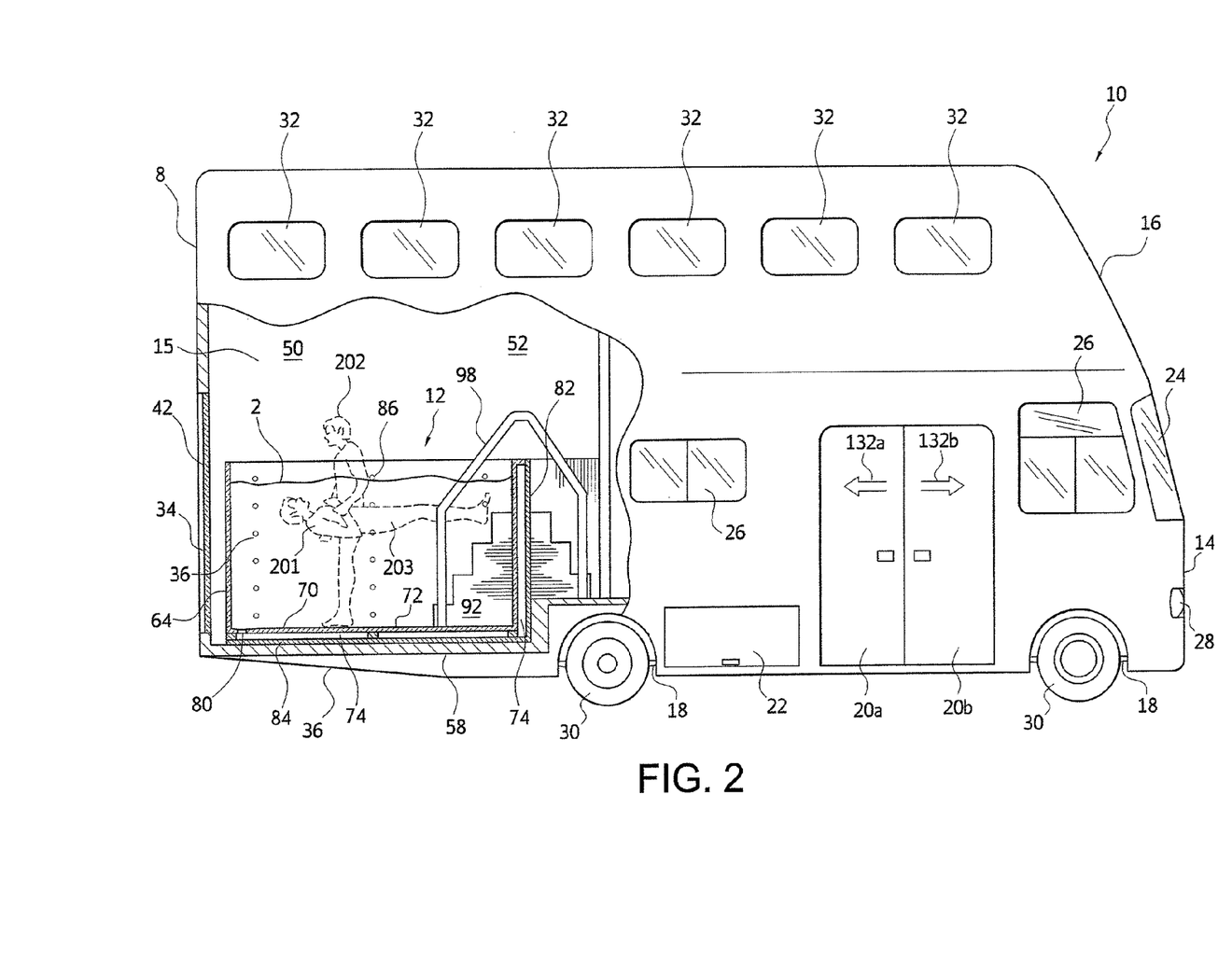
FIG. 2 is a right side view of the transport device shown in FIG. 1, including a broken away view of a rear interior section of the transport device, which includes a full-body immersion baptismal pool.

Turning in detail to the drawings, FIGS. 1 and 2 each show a side view of a transport device 10, having a full-body immersion baptismal pool 12 (FIG. 2) incorporated therein. In this configuration, the transport device 10 appears from the outside to be a bus, trailer, motorhome, or other transport device type that includes a transport device body 8 with sufficient length, width, and height to house a full body immersion baptismal pool 12. The transport device body 8 includes a lower transport device body 14 and an upper transport device body 16, which are both supported by a chassis and suspension system 18 disposed under the lower transport device body 14. The transport device 10 also includes all systems and sub-systems and respective components of these systems and sub-systems, which allow for operation of the transport device to travel from an initial location to a final location.

The lower transport device body 14 and the upper transport device body 16 may be separate components, which are connected using any known method (e.g. fasteners, welding, etc.). However, in preferred configurations, the lower and upper transport device bodies are integral, meaning that they are manufactured from at least one common material. One suitable method of manufacture for integral lower and upper transport device bodies is thermoplastic molding. Together, the lower and upper transport device bodies provide sufficient clearance area 15 (FIG. 2) such that a plurality of pool users may enter the pool 12 without substantial hindrances. Preferably, the clearance area is sufficient to support a user who stands fully upright in the transport device, while positioned on stairs, as further described below.

From an exterior view, as shown in FIGS. 1 and 2, these systems, sub-systems, and components of these systems and sub-systems include, but are not limited to, one or more entry doors 20a, 20b, one or more access doors 22, one or more lower front windows 24, one or more lower side windows 26, lighting and signaling systems 28, and wheels 30. In addition to these elements, from an exterior view, the transport device may also include at least two of the rear windows and side windows positioned on a rear exterior section 35 of the transport device 10. These windows may be designated as viewing windows 40, 42.

Figure 4:
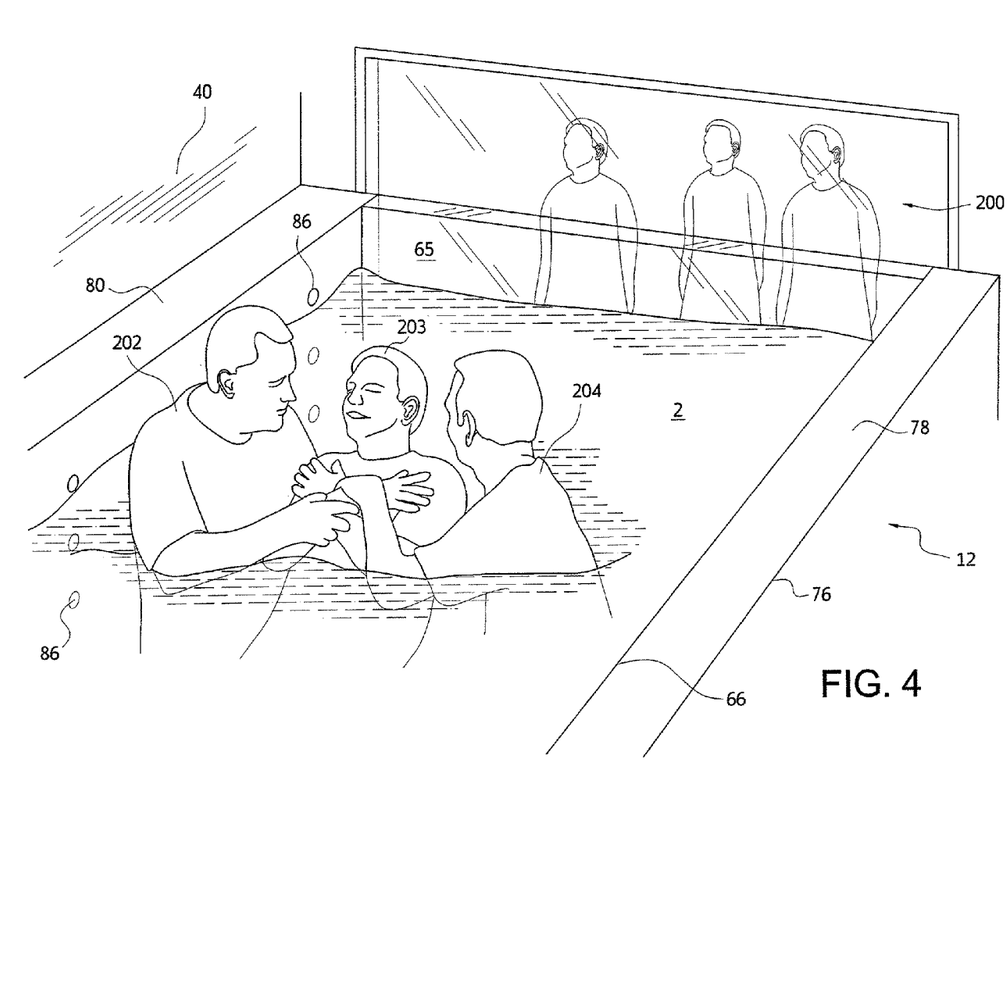
FIG. 4 is a perspective view of a portion of a rear interior section of a transport device having a full body immersion baptismal pool incorporated therein.

FIG. 1 shows a side viewing window 40, as an optional feature, which may be coupled to a curtain 41. The viewing windows 40, 42 are of sufficient transparency such that onlookers 200 (FIG. 4) may view interior elements of the transport device, including a full-body immersion baptismal pool 12 in order to witness a baptismal ceremony. One representation of a baptismal ceremony with a plurality of onlookers 200, viewing the ceremony from rear window 34, is shown in FIG. 4.

Internal elements of the transport device, which assure effective operation of the transport device to travel are not shown, but generally include various electrical systems and sub-systems and electrical components. These include charging and electrical supply systems (i.e. batteries), gauges, meters, air conditioning systems, heating systems, windshield wiping systems, ignition systems, breaking systems, engine systems, transmission systems, exhaust systems, fuel supply systems, hoses, sensors, switches, cables, wiring, etc.

Figure 3:
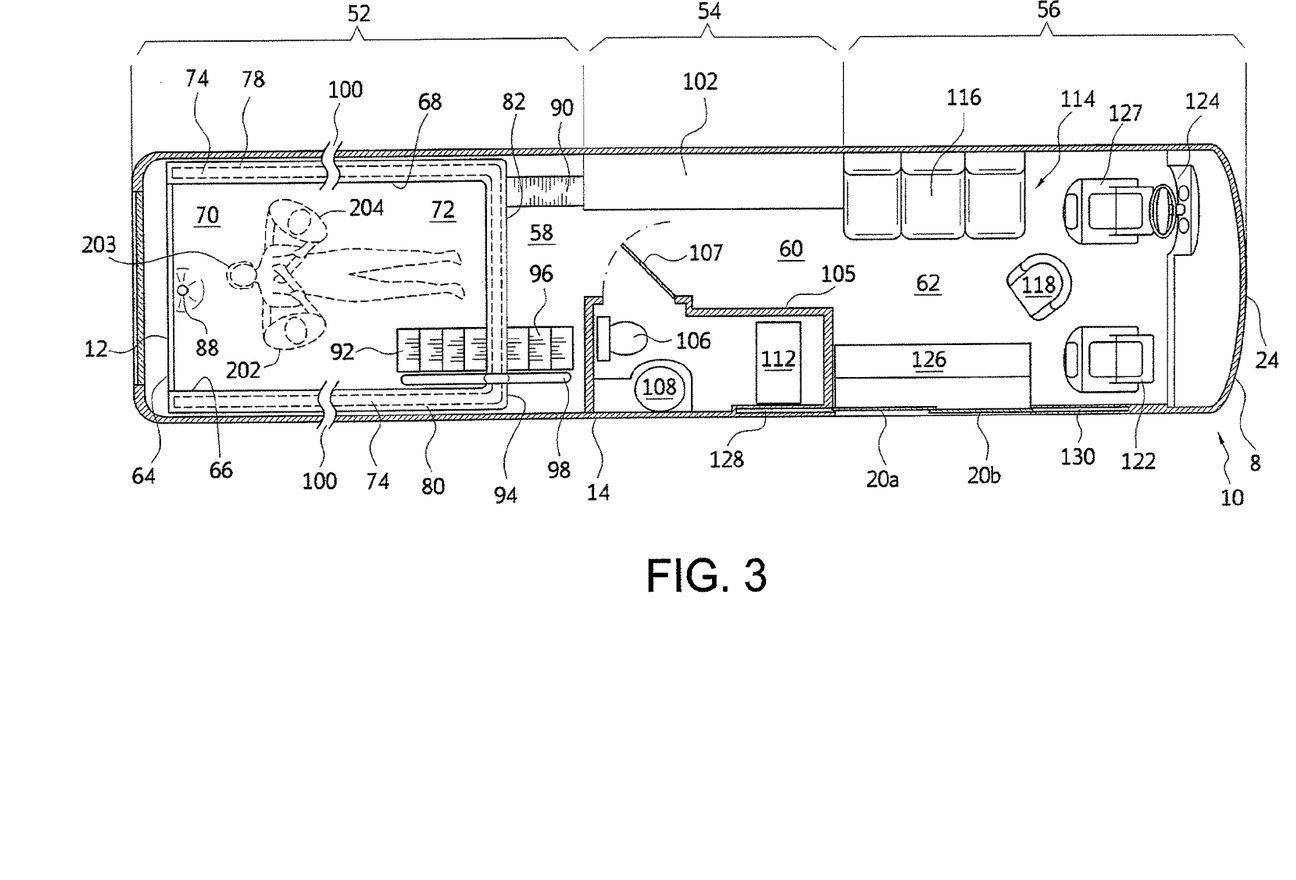
FIG. 3 is a top cross-sectional view of the transport device shown in FIG. 1.

FIG. 2 shows a side view of an interior 50 of the transport device 10, while FIG. 3 shows a top cross-sectional view of the interior 50 of the transport device 10. In this configuration of the transport device, a majority of interior elements are at least partially contained within the lower transport device body 14. The interior 50 includes a rear interior section 52, a central interior section 54, and a frontal interior section 56, which are supported by respective floor sections 58, 60, 62. This configuration, however, should not be construed as limiting. The interior 50 may include additional sections or compartments, depending, in part, upon the type of interior systems and components contained within the transport device.

Preferred configurations of the transport device 10 include the full-body immersion baptismal pool 12 in the rear interior section 52. The rear interior section 52, however, may or may not be cordoned off from the central interior section 54 and frontal interior section 56. The baptismal pool 12 includes a basin 64, having a surrounding wall portion 66 that extends around an inner perimeter 68 of the pool 12 and a bottom portion 70 that extends along a bottom surface 72 of the pool 12. The surrounding wall portion may also include a transparent wall section 65, as shown in FIG. 4.

The surrounding wall portion 66 is shown having a substantially rectangular shape. The surrounding wall portion may, however, be manufactured to have another shape. For example, the surrounding wall portion may have an oval, circular, triangular, hexagonal, or other polygonal shape.

Referring particularly to FIG. 2, a filtration cavity 74 is formed between the surrounding wall portion 66 of the basin 64, an outer pool wall 76, having outer pool side sections 78, 80 and a front pool side section 82, and a bottom pool wall 84. The pool 12 may also include a rear pool side section (not shown). The filtration cavity 74 is configured to receive water 2 that enters through apertures 86 and a drain 88. Contained within the apertures and the drain may be one or more filters (not shown). The filtration cavity 74 is coupled to a filtration system 90, which is configured to recycle and/or purify water 2. The filtration system may also be coupled to a separate water drainage system (not shown).

For baptismal purposes, water 2 may be filled into the pool 12, using one or more plumbing systems (not shown), which includes faucets and piping that provide pathways for water to enter into the pool. Preferably, such systems are connected to a water tank or other water supply, which is positioned in one or more internal sections (not shown) of the transport device. Alternatively, the water tank or water supply may be external to the transport device such that water may be replenished as deemed necessary.

Also positioned within the pool 12 are internal stairs 92, which extend downwardly to the bottom surface 72 of the pool and external stairs 96, which are coupled to an external wall 94 of the pool. Both the internal stairs 92 and external stairs 96 and one or more railings 98 facilitate entry of one or more users 202, 203, 204 into the baptismal pool 12. The pool configuration shown and described herein accommodates persons of all sizes and shapes such that the body 201 of one user 203 may be fully immersed into the pool 12. This pool embodiment may also be configured to allow for swimming, particularly lap swimming by a plurality of user. In addition to the adjustment features, broken lines 100, similarly indicate that the width and length of the pool may be extended to allow for both baptismal and swimming uses.

Referring particularly to FIG. 3, the interior 50 of the transport device 10 also includes a central interior section 54 and a frontal interior section 56. The central interior section 54 may include a central seating section 102 and bathroom facilities 104. The central seating section 102 may act as a waiting area for users or a viewing area for onlookers who prefer to view a baptism from inside the transport device. The bathroom facilities 104 are contained within bathroom walls 105 and a door 107 and generally include a toilet 106, a sink 108 positioned on or partially within a cabinet 110 and a closet 112. The bathroom facilities are of sufficient size such at least one user can comfortably change clothes in the bathroom facilities. The closet may be used to contain swimming or baptismal apparel, for example. The frontal interior section 56 may include a frontal seating area 114, which includes side seating 116, a frontal middle seat 118, a driver seat 120, and a frontal side seat 122. The driver seat 120 is positioned adjacent to steering, driving, door, and window controls 124. The frontal interior section 56 also includes an entryway 126, which is coupled to entry doors 20a, 20b. The entry doors 20a, 20b may be configured to slide into one or more paneled areas 128, 130 of the lower transport device body 14 such that the entry doors 20a, 20b may slide in opposing directions, as indicated by directional arrows 132a, 132b (FIG. 2). In an alternative embodiment, the entryway and entry doors may be configured to be handicap accessible such that a ramp or other suitable device may be attached to the entry doors. Entry doors may also have a more traditional configuration, which includes hinges such that the doors may extend inwardly toward the interior or outwardly toward the exterior of the transport device.

Figure 5:
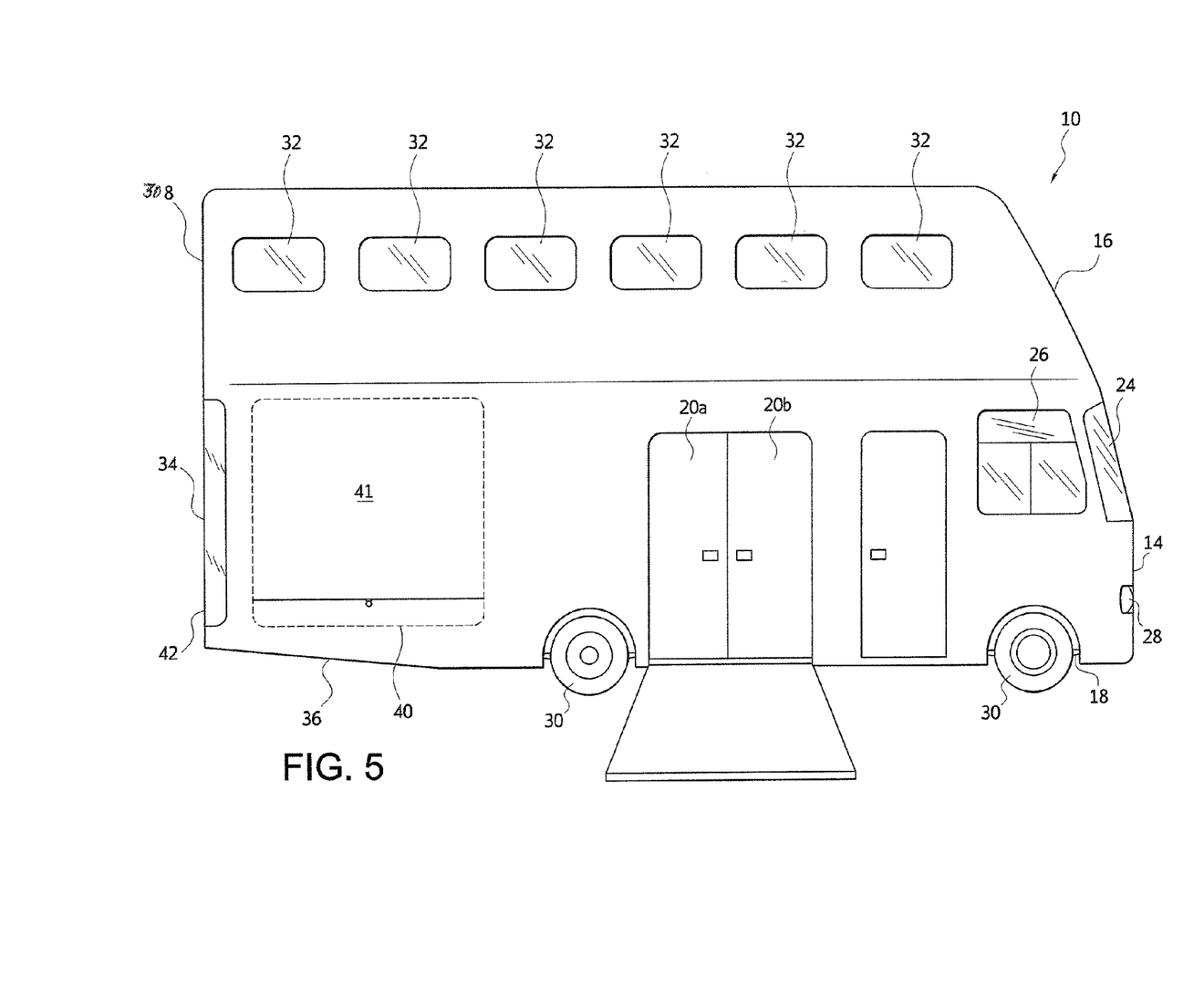
FIG. 5 is a right side view of a second embodiment of a transport device having a full-body immersion baptismal pool incorporated therein.
Figure 6:
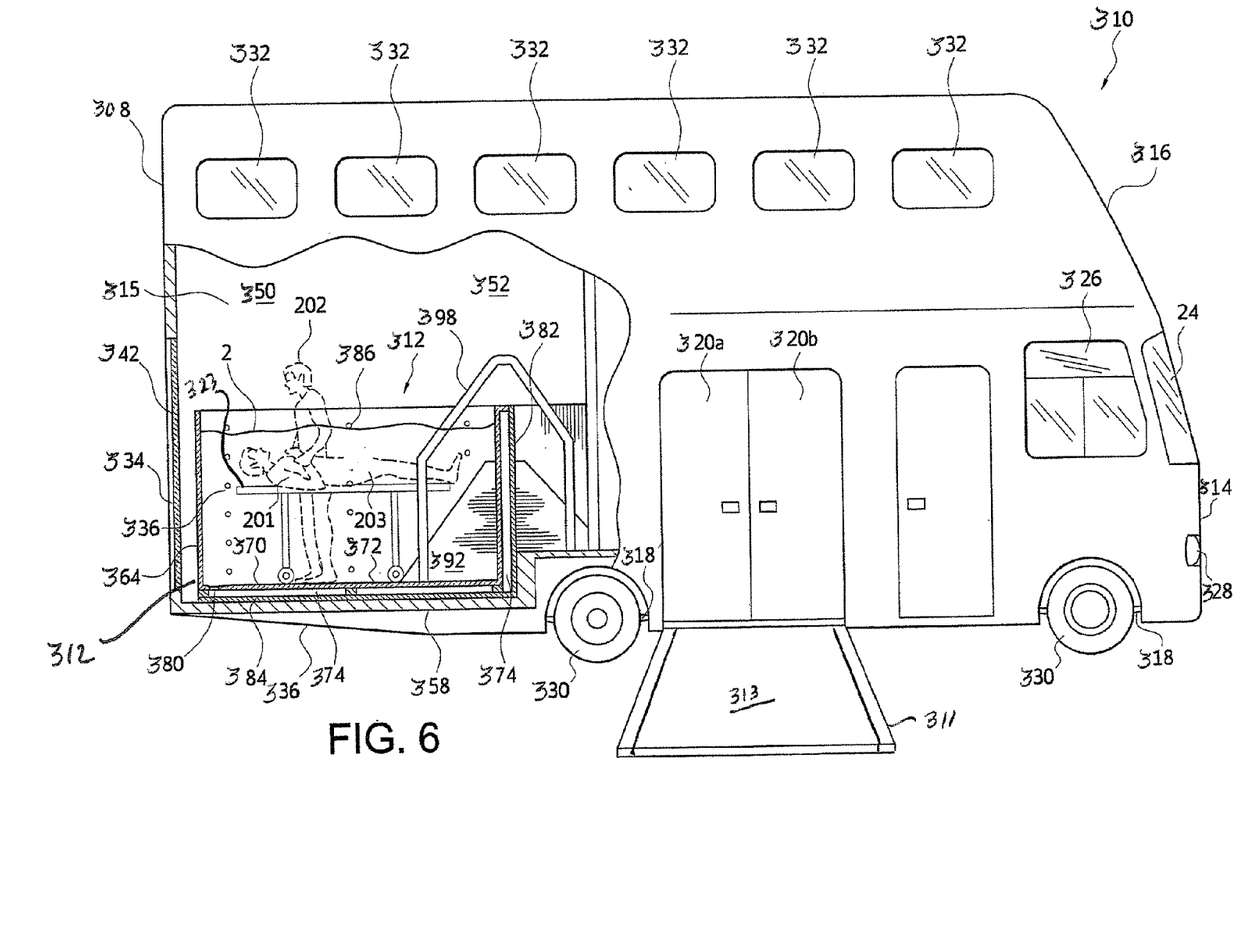
FIG. 6 is a right side view of the transport device shown in FIG. 5, including a broken away view of a rear interior section of the transport device, which includes a second embodiment of a full-body immersion baptismal pool.

FIGS. 5 and 6 each show a side view of a second embodiment of a transport device 310, having a full-body immersion baptismal pool 312 (FIG. 6) incorporated therein. The reference numerals of the second embodiment are distinguishable from those of the first embodiment by adding three-hundred (300), but otherwise may indicate the same elements as indicated in the first embodiment, unless otherwise specified. The transport device 310 of the second embodiment is substantially similar to the first embodiments described above. The description of certain similarities between the embodiments may be omitted herein for the sake of brevity and convenience, and, therefore, is not limiting.

Like the first embodiment, the transport device 310 includes a transport device body 308 with sufficient length, width, and height to house a full body immersion baptismal pool 312. The transport device body 308 similarly includes a lower transport device body 314 and an upper transport device body 316, which are both supported by a chassis and suspension system 318 disposed under the lower transport device body 314.

Together, the lower and upper transport device bodies 314, 316 of this embodiment, as shown particularly in FIG. 6, provide sufficient clearance area 315 (FIG. 2) such that a plurality of pool users may enter the pool 312 without substantial hindrances. In this embodiment, however, the transport device 310 includes additional features that would accommodate persons with physical limitations such as those who are confined to hospital beds, wheelchairs, or other apparatuses that assist with physical mobility. Pool users preferably enter into the transport device 310, using an entry ramp 311 that may be integral to or separate from the transport device. The entry ramp 311 may also include a movable belt 313 that may be used to automatically transport pool users from the exterior of the transport device into the interior of the transport device, through doors 320a, 320b.

Figure 7:
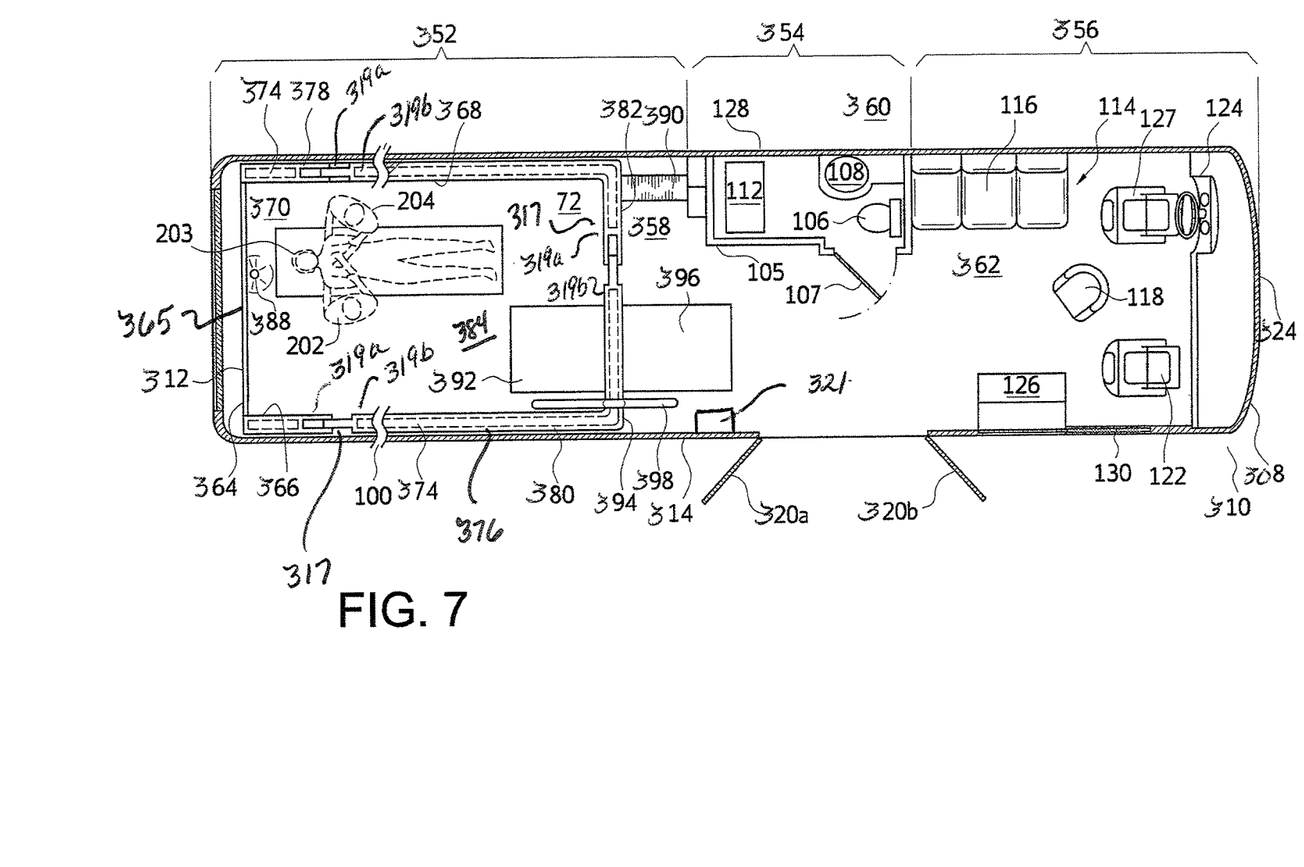
FIG. 7 is a top cross-sectional view of the transport device shown in FIG. 5.
Figure 8:
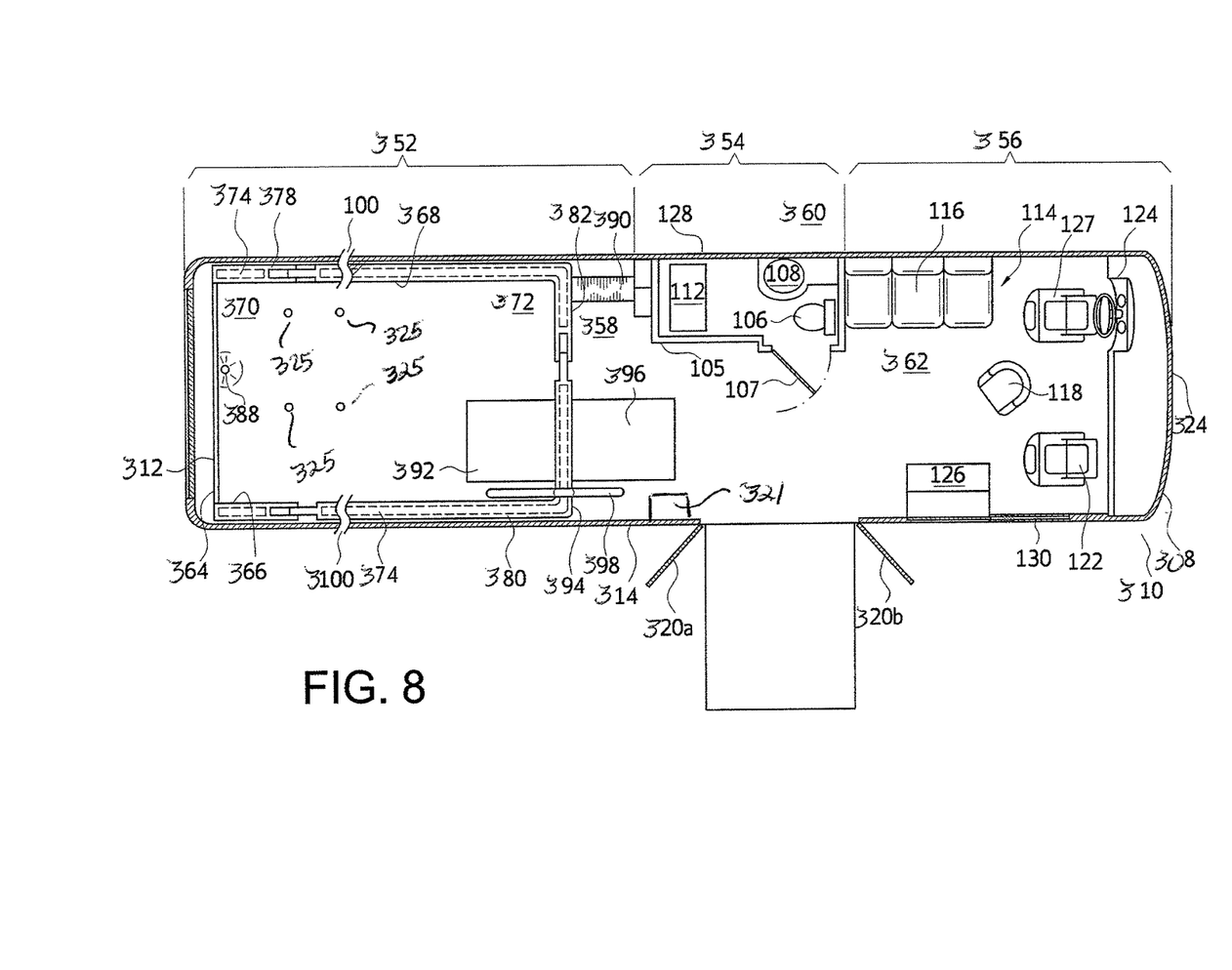
FIG. 8 is another top cross-sectional view of the transport device shown in FIG. 5.

FIG. 6 also shows a side view of an interior 350 of the second embodiment of the transport device 310, while FIGS. 7 and 8 show top cross-sectional views of the interior 350. In this embodiment of the transport device, the interior 350 similarly includes a rear interior section 352, a central interior section 354, and a frontal interior section 356, which are supported by respective floor sections 358, 360, 362. This configuration, however, should also not be construed as limiting. The interior 350 may include additional sections or compartments, depending, in part, upon the type of interior systems and components contained within the transport device.

This embodiment of the transport device 310 also includes the full-body immersion baptismal pool 312 in the rear interior section 352. Like the first embodiment, the baptismal pool 312 includes a basin 364 with a wall portion 366 that extends around an inner perimeter 368 of the pool 12 and a bottom portion 370 that extends along a bottom surface 72 of the pool. The surrounding wall portion may also include one or more transparent wall sections 365, as shown in FIG. 7. These wall sections, however, may be replaceable to accommodate for longer pool widths due to length and width adjustment features. The surrounding wall portion 366, therefore, preferably includes size adjustment sections 317 that allow the overall size of the baptismal pool to be increased or decreased. The pool 312 shown having a substantially rectangular shape, but may be manufactured to have any shape. The size adjustment sections 317 may include complementary telescoping elements 319a, 319b. These elements allow for the pool 312 to be adjusted to accommodate various size beds, and particularly beds configured to support obese persons weighing up to 1000 pounds (lbs.). For example, a hospital bed that is 54 inches wide and 88 inches in length is one bed configuration which is known to accommodate all sizes of people and to hold up to 1,000 pounds.

One or more sections of the transport device preferably include a control panel 321, as shown in FIG. 7. The control panel will be used to control automatic, comfort, adjustment, and baptism-assistance features of the baptismal pool 312. Automatic and comfort features of the pool include, but are not limited to automatic water level adjustment, temperature adjustment (capable of adjusting heating and/or cooling elements (not shown), which may be incorporated into the pool) one or more elements that provide for self-cleaning, internal air freshening, dehumidifying, filtration adjustment, and sanitation adjustment (e.g. automatic adjustment the amount of chlorine used in the pool). The water level adjustment is used to automatically adjust water height such that the pool can accommodate adults, children, and persons with limited physical mobility who are positioned in the pool while on wheelchair and beds. FIGS. 6 and 7 show the pool 312 with a user 203 positioned on a bed 323

Still referring to FIG. 7, a filtration/water level adjustment cavity 374 is formed between the surrounding wall portion 366 of the basin 364. The outer pool wall 376, includes outer pool side sections 378, 380, a front pool side section 382, and a bottom pool wall 384. The pool 12 may also include a rear pool side section (not shown) with width adjustment features rather than the viewing window. The filtration/water level adjustment cavity 374 is configured to receive water 2 that enters through apertures 336 (FIG. 6) and a drain 388.

Contained within the apertures and the drain may be one or more filters (not shown). The cavity 374 is coupled to a filtration system 390, which is configured to recycle and/or purify water 2. The filtration system may also be coupled to a separate water drainage system (not shown).

For baptismal purposes, water 2 may be filled into the pool 312, using one or more plumbing systems (not shown), which includes faucets and piping that provide pathways for water to enter into the pool. Preferably, such systems are connected to a water tank or other water supply, which is positioned in one or more internal sections (not shown) of the transport device. Alternatively, the water tank or water supply may be external to the transport device such that water may be replenished as deemed necessary.

Also positioned within the pool 312 are internal ramps 392, which extend downwardly to the bottom surface 372 of the pool and external ramps 396, which are coupled to an external wall 394 of the pool. Both the internal ramps 392 and external ramps 396 and one or more railings 398 facilitate entry of one or more users 202, 203, 204 into the baptismal pool 312.

Figure 9A:
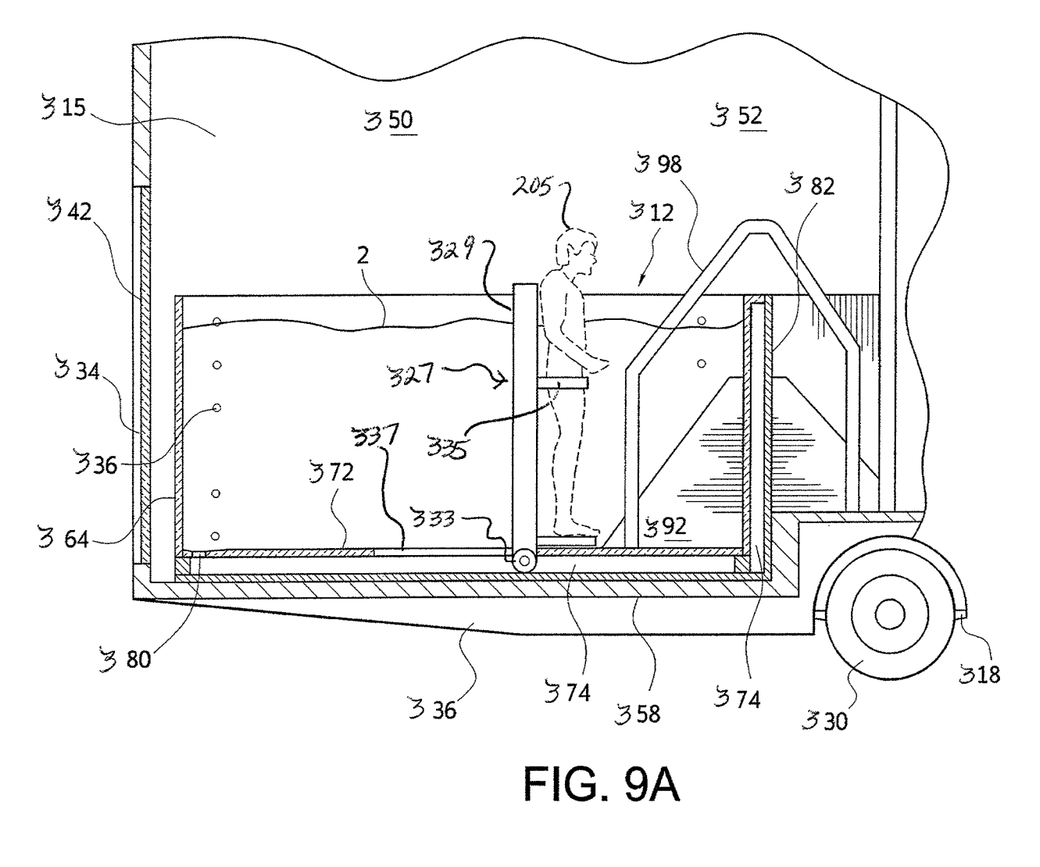
FIG. 9A is a rear cross sectional view of a transport device, which incorporates an immersion-assistance device in a full-body immersion baptismal pool.
Figure 9B:
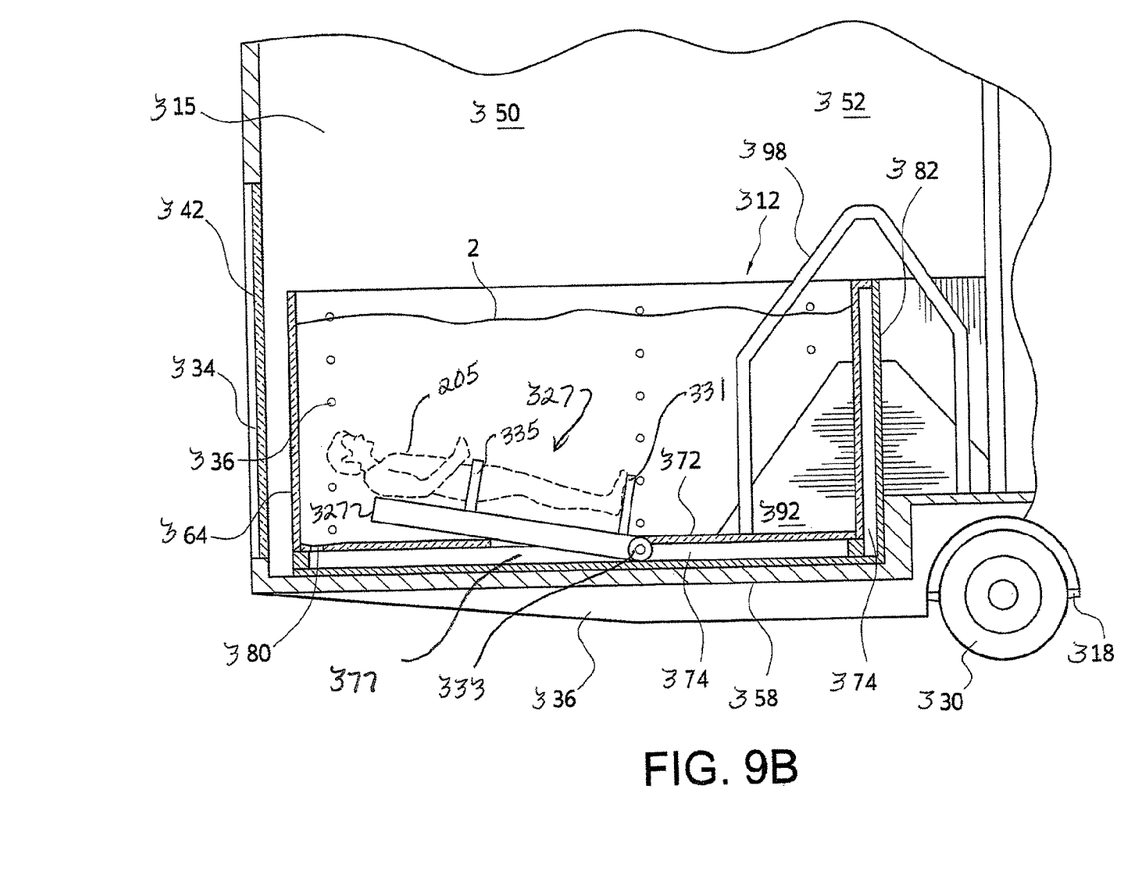
FIG. 9B is another rear cross-sectional view of the transport device shown in FIG. 9A with the immersion-assistance device in a second position.

FIGS. 8, 9A, and 9B show additional baptism-assistance features that may be incorporated into the pool. FIG. 8 shows a top view of the pool with locators 325 positioned on the bottom surface 372 of the pool. The locators 325 are used to indicate the preferred position for those who are assisting the persons to be baptized (e.g. pool users 202, 204, shown in FIG. 7). The locators may be visual indicators with a specific shaped, e.g. a circle as shown in FIG. 8. Alternatively, or in addition to, the locators may incorporate different sensory elements that would allow the pool users to know where to position their feet during the baptismal ceremony. Such sensory elements may include ridges, depressions, or protrusions that are integrated with locators 325. FIGS. 9A and 9B show a baptism-assistance apparatus 327 that allows a person 205 to be "dipped" without assistance from other pool users. The apparatus include a vertical positioning element 329, a horizontal positioning element 331, and a pivot element 333 coupled to a distal end of at least the vertical positioning element, and restraining elements 335. The apparatus is preferably coupled with control panel 321 such that the user may be automatically lowered and raised into the baptismal pool 312 without assistance, after the restraining elements are properly positioned. The apparatus may also accommodate a person in a wheelchair in addition to an upright user 205. A portion of the apparatus or the entire apparatus 327 may also be stored in a cavity 337 disposed under the pool, as shown schematically in FIG. 9B, or alternatively built into a floor area of the pool (i.e. within the pool itself).

Figure 10:
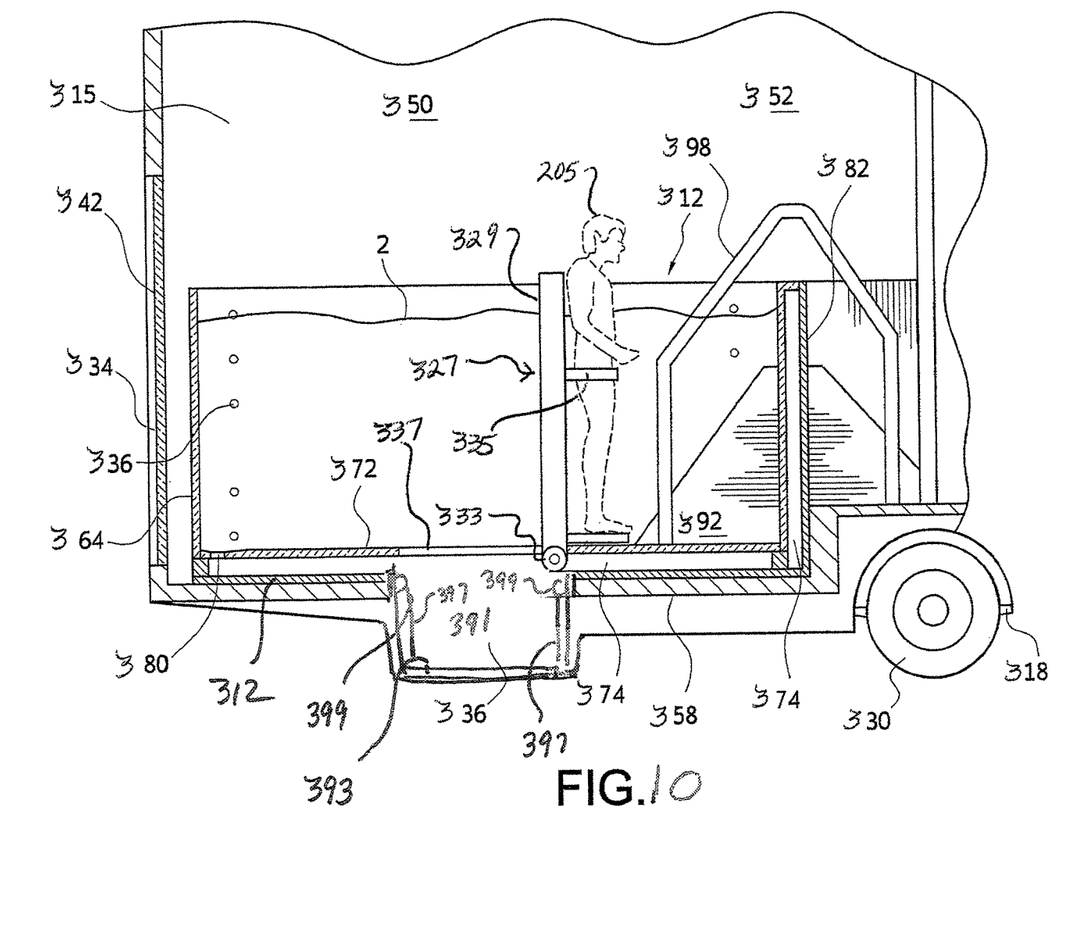
FIG. 10 is a rear cross-sectional view of an alternate transport device, including a storage area and dolly/elevator for the immersion-assistance device.

FIG. 10 shows an alternate embodiment of a transport device 310, which incorporates a storage area 391 and a elevator/dolly 393 into a bottom area 395 of the transport device. The storage area 391 is preferably of sufficient size to hold and store all components of the baptismal pool 312. The elevator/dolly may be configured as a platform and preferably includes cables 397 and pulley 399 that allow the transport device to be moved from a lower position inside the storage area to an upper position inside the baptismal pool.

All materials for the respective components and elements of the transport device are preferably corrosion resistant and are manufactured from materials having suitable strength for their intended purpose. Such materials include, but are not limited to, composite materials, thermoplastic materials, metallic materials, stainless steels, etc. Any and all materials used, however, are preferably consistent with federal and/or state guidelines for transport device use.

Thus, various configurations of transport devices having a full-immersion baptismal pool incorporated therein are disclosed herein. While embodiments of this invention have been shown and described, it will be apparent to those skilled in the art that many more modifications are possible without departing from the inventive concepts herein. The invention, therefore, is not to be restricted except in the spirit of the following claims.

The invention claimed is:

1. A transport device, comprising:
a body having a plurality of interior sections contained within the body, a full-immersion baptismal pool disposed in at least one of the interior sections, and a cavity disposed under the full-immersion baptismal pool,
the full-immersion baptismal pool comprising at least one baptism-assistance apparatus coupled to a control panel disposed within the body,
the baptism-assistance apparatus comprising a vertical positioning element, a horizontal positioning element coupled to the vertical positioning element, and a pivot element connected to a distal end of the vertical positioning element,
wherein the pivot element of the baptism-assistance apparatus is contained within the cavity disposed under the full-immersion baptismal pool, and the vertical positioning element is tiltable about the pivot element such that a portion of the vertical positioning element is disposed within the cavity during use of the baptism-assistance apparatus.

2. The transport device of claim 1, wherein the full-immersion baptismal pool further comprises a filtration system.

3. The transport device of claim 1, full-immersion baptismal pool further comprising at, least one of an automatic water level adjustment element, a temperature adjustment element a self-cleaning element, an internal air freshening element, a dehumidifying element, a filtration adjustment element, and a sanitation adjustment element.

4. The transport device of claim 2, wherein the filtration system is configured to recycle water for the full-immersion baptismal pool.

5. The transport device of claim 2, wherein the filtration system is configured to purify water for the full-immersion baptismal pool.

6. The transport device of claim 1, wherein the body comprises a plurality of viewing windows for viewing of a baptismal ceremony within the transport device.

7. The transport device of claim 1, wherein the at least one interior section is disposed in a rear of the body.

* * * * *